United States Patent
Smetz

(10) Patent No.: US 6,874,206 B2
(45) Date of Patent: Apr. 5, 2005

(54) COMPONENT FOR REGULATING OR MODIFYING THE EFFECTIVE LENGTH OF A ROUND STEEL CHAIN

(75) Inventor: Reinhard Smetz, Baldingen (DE)

(73) Assignee: RUD-Kettenfabrik Rieger & Dietz GmbH u. Co., Aalen-Unterkochen (DE)

( * ) Notice: Subject to any disclaimer, the term of this patent is extended or adjusted under 35 U.S.C. 154(b) by 0 days.

(21) Appl. No.: 10/362,118

(22) PCT Filed: Sep. 1, 2001

(86) PCT No.: PCT/DE01/03423

§ 371 (c)(1),
(2), (4) Date: Feb. 19, 2003

(87) PCT Pub. No.: WO02/21014

PCT Pub. Date: Mar. 14, 2002

(65) Prior Publication Data

US 2004/0098842 A1 May 27, 2004

(30) Foreign Application Priority Data

Sep. 4, 2000 (DE) ........................ 100 44 531

(51) Int. Cl.⁷ ............................................. F16G 15/04
(52) U.S. Cl. ........................................ 24/116 R; 59/93
(58) Field of Search .......................... 24/115 R, 70 TT, 24/582.12, 68 CT, 68 TT, 69 TT, 69 WT, 70 CT, 115 A, 582.13, 577.1, 69 T, 583.1; 59/93

(56) References Cited

U.S. PATENT DOCUMENTS

| | | | | | |
|---|---|---|---|---|---|
| 4,149,369 A | * | 4/1979 | Smetz | ...................... | 24/116 R |
| 4,247,966 A | * | 2/1981 | Labbe | ...................... | 24/116 R |
| 4,398,387 A | * | 8/1983 | Bary | .............................. | 59/93 |
| 5,309,706 A | * | 5/1994 | Lasaroff et al. | ........... | 24/116 R |
| 5,724,804 A | * | 3/1998 | Smetz | ...................... | 24/116 R |
| 5,732,545 A | * | 3/1998 | Fredriksson | ................... | 59/93 |
| 5,765,891 A | * | 6/1998 | Fredriksson | .............. | 24/116 R |
| 5,829,810 A | * | 11/1998 | Fredriksson | .............. | 24/116 R |
| 6,568,165 B2 | * | 5/2003 | Smetz | ...................... | 24/116 R |

FOREIGN PATENT DOCUMENTS

| | | | |
|---|---|---|---|
| DE | 41 15 341 A1 | * | 12/1992 |
| DE | 42 39 482 A1 | * | 5/1994 |
| EP | 130138 | | 1/1985 |
| EP | 0 217 761 A2 | * | 8/1987 |
| EP | 736150 | | 7/1997 |
| GB | 2088520 | | 6/1982 |
| GB | 2127129 | | 4/1984 |
| GB | 2 221 742 A | * | 2/1990 |
| WO | WO 94/25777 | * | 11/1994 |
| WO | WO 95/17620 | * | 6/1995 |
| WO | WO 96/00861 | * | 1/1996 |

* cited by examiner

Primary Examiner—Robert J. Sandy
(74) Attorney, Agent, or Firm—Mark P. Stone

(57) ABSTRACT

A component (1) for regulating or modifying the effective length of a round steel chain (22) has at least one cross recess consisting of a longer recess (12) and a shorter recess (6). The chain can be threaded into the cross recess. The component also has a pin (11) for fixing the component in a particular position in relation to the chain (22). The pin forms a blocking element and has at least one groove (14) which forms the end of the longer recess when the cross recess is free. During normal operation, the groove is forced by a spring (10) into a position in which the pin (11) blocks the cross recess.

20 Claims, 4 Drawing Sheets

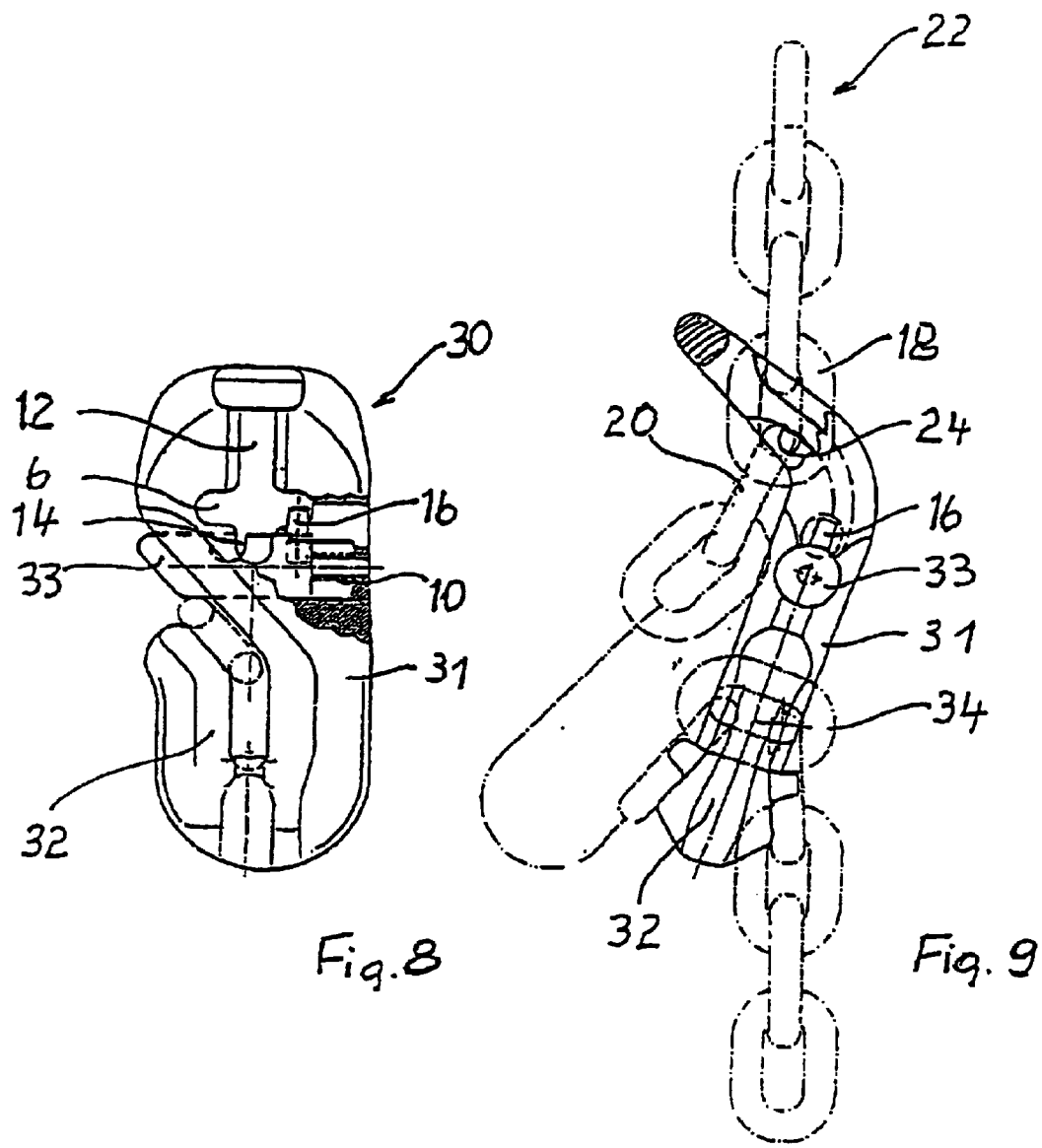

US 6,874,206 B2

COMPONENT FOR REGULATING OR MODIFYING THE EFFECTIVE LENGTH OF A ROUND STEEL CHAIN

TECHNICAL FIELD

The invention relates to a component for regulating or modifying the effective length of round steel chains, in which at least two crossing slots are arranged in a basic body, form an insertion or pull-through opening for the respective chain in their crossing area and of which one is longer than the other, the respective longer slot being bounded outside the crossing area of the slots by two supporting zones which serve to support the curved end in each case of a chain link which follows a chain link inserted with its limbs into the longer of the two slots, it being possible for the latter link to be secured by a blocking element against displacement into the area of the insertion or pull-through opening.

PRIOR ART

EP 0 736 150 B1 discloses a component of the above type in which the basic body has the crossing slots at its one end and a shortening claw at its other end. While the crossing slots are used merely for the positioning and subsequent permanent fitting of the component at a specific point on the chain, the shortening claw serves to adapt the length of the chain to changing circumstances. The blocking element for the chain link inserted into the end of the longer slot which faces away from the crossing area is formed in the known component by a clamping sleeve or a clamping pin, which bridges the longer slot between the crossing area of the slots and the chain link located at the end of this slot facing away from the crossing area. The type of blocking element used means that a modification to the position of the component on the chain is possible only with a comparatively great deal of effort and with the aid of tools. In order to secure the chain link hooked into the shortening claw of the component and belonging to the chain strand section respectively to be shortened, use is made, by contrast, of a locking pin which can be moved to and fro counter to the action of a spring, is mounted in opposite side walls of the claw mouth and which, in its blocking position, projects into the interspace between the noses of two links following one another with the same orientation. The pin has a groove which, in a specific position, permits the removal of the chain link hooked into the claw from the claw.

SUMMARY OF THE INVENTION

The invention is based on the object, in the case of a generic component, of also providing the insertion or pull-through opening for the chain, formed by the crossed slots, with a blocking element which permits trouble-free and rapid modification of the initial position of the component on the chain. According to the invention, this object is achieved by the blocking element comprising a pin that can be moved to and fro and is provided on its circumference with at least one groove, by the pin being held by a spring in a first position, in which it projects with its cylindrical circumference into the end of the longer slot in the crossing area of the slots, forming a stop that largely fills this end and prevents displacement of the chain link guided in the longer slot into the crossing area of the slots, and by the pin being transferred, counter to the action of the spring holding it in the first position, into a second position, in which its groove forms the end of the longer slot in the crossing area of the slots.

The component according to the invention offers the advantage that its position on a chain can be adapted conveniently and simply to changed conditions. Critical to the achievement of the advantage obtained is the arrangement of the blocking element at a point differing from the position of the clamping pin or the clamping sleeve of the known design, and the formation of the groove as a slot end, the position of the blocking element opening up a particularly advantageous possible configuration of the component, which consists in using the blocking element as a double safeguard for two connecting points.

BRIEF DESCRIPTION OF THE DRAWINGS

Further features and details of the invention emerge from the subclaims and the following description of a number of embodiments of the invention illustrated in the appended drawing, in which:

FIG. 8 shows, partly in section, the front view of a further component, FIG. 9 shows, partly in section, the side view of the component according to FIG. 8 connected to a chain strand.

WAYS OF IMPLEMENTING THE INVENTION

Figure 4:
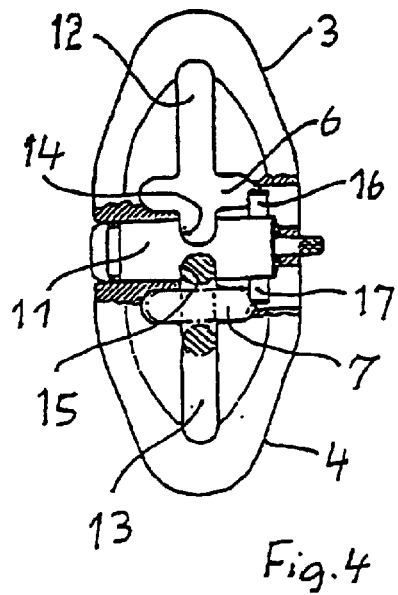
FIG. 4 shows, partly in section, the front view of the component and of the blocking element in its second position.

In FIGS. 1 to 4, 1 generally denotes a component whose basic body 2 is C-shaped and consequently has two angled ends 3 and 4. The basic body 2 has two short slots 6 and 7 oriented at right angles to its longitudinal axis 5 and a slot which is continuous from the start but is subdivided by a pin 11 which can be displaced to and from in the side walls 8, 9 of the basic body 2, counter to the action of a spring 10, into two longer slots 12 and 13, whose shorter end is formed by straight grooves 14 and 15 machined into the pin 11, as shown in FIG. 4. The pin 11 has two protrusions 16, 17 formed by the ends of a clamping sleeve which is pressed into a hole in the pin 11 and which, in the blocking position of the pin 11 illustrated in FIG. 2, project into the respective right-hand end of the two shorter slots 6, 7. The protrusions 16, 17 fulfil a double function, in that firstly they form an anti-rotation safeguard for the pin 11 and, secondly, in that they ensure that the pin 11 can move into its blocking position illustrated in FIG. 2 only when none of the chain links 20, 21 following the chain links 18, 19 that can be inserted into the longer slots 12, 13 is located in the area of the shorter slots 6, 7. The function last described prevents the tensile forces acting in the chain being introduced into the component 1 via the pin 11 in the event of improper use of the component.

Figure 1:
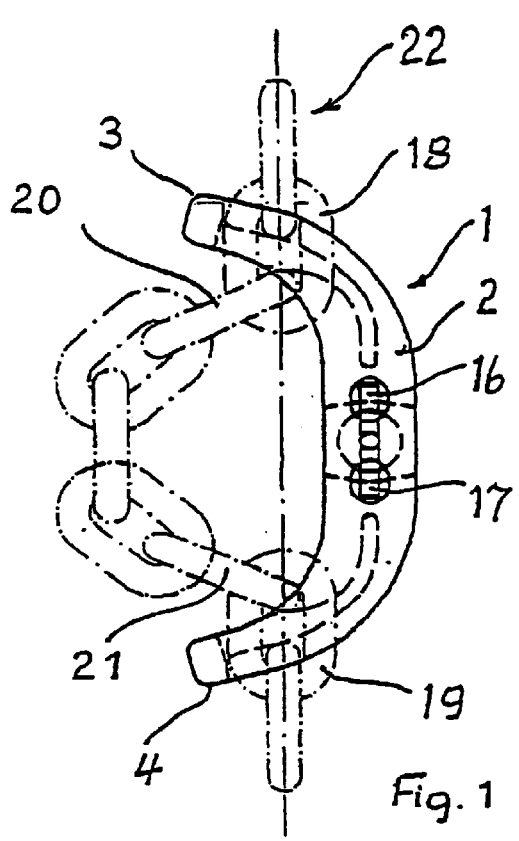
FIG. 1 shows a side view of a particularly advantageous component.
Figure 2:
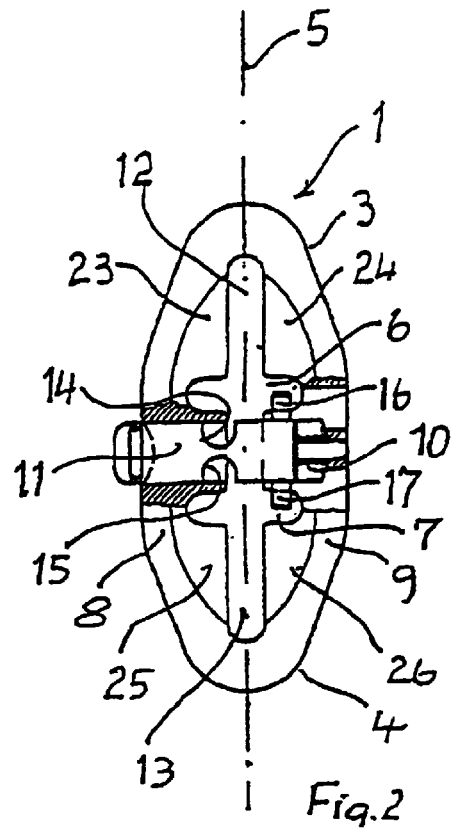
FIG. 2 shows, partly in section, the front view of the component according to FIG. 1 in a first position of the blocking element.
Figure 3:
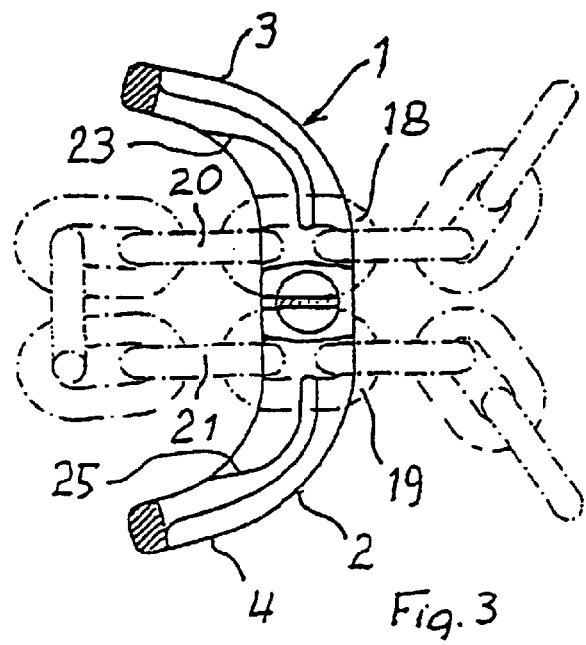
FIG. 3 shows, partly in section, a side view corresponding to FIG. 1 with the blocking element removed from the position illustrated in FIG. 2.

FIG. 1 shows the conditions as are given in the case of a chain strand 22 shortened by two links. The transmission of the forces acting in the chain to the component 1 lying in the force flow takes place via the noses of the chain links 20 and 21, which, in the region of the angled ends 3, 4 of the basic body 2, are supported at supporting zones 23, 24 and 25, 26 respectively placed on both sides of the slots 12, 13.

Figure 5:
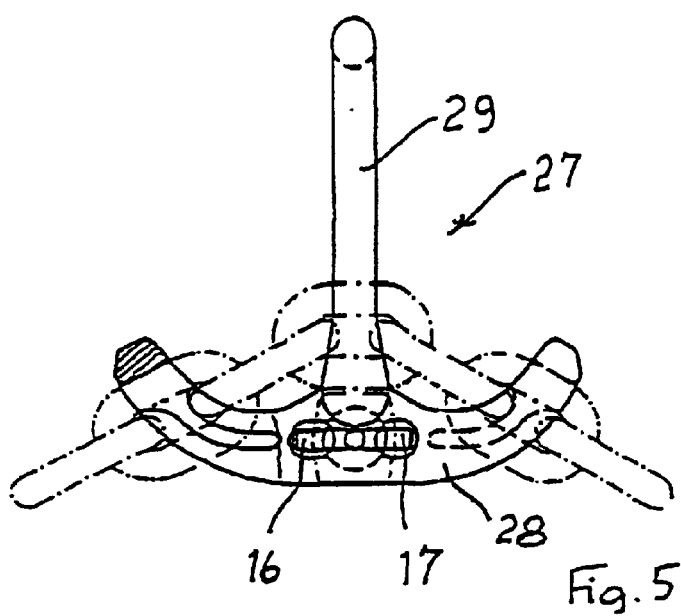
FIG. 5 shows, partly in section, the side view of a modified component.
Figure 6:
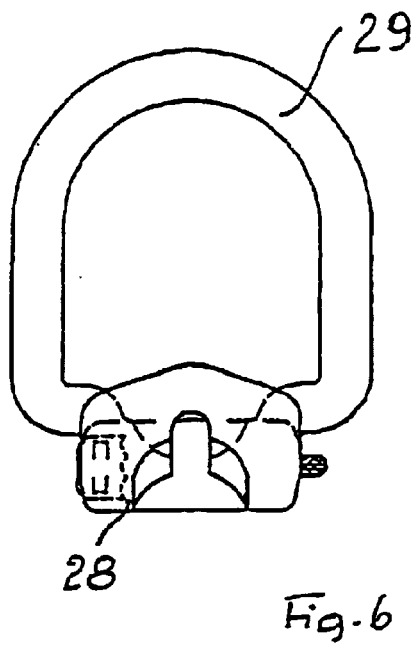
FIG. 6 shows the end view of the component according to FIG. 5.
Figure 7:
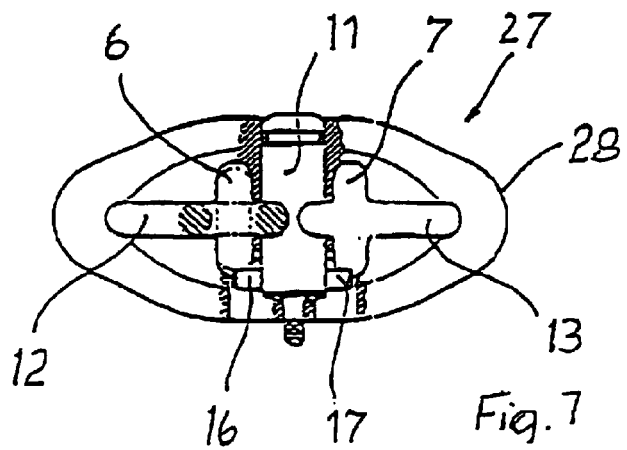
FIG. 7 shows, partly in section, a plan view of the slots in the basic body of the component according to FIG. 5 with the blocking element transferred into its release position.

While the arrangement illustrated in FIGS. 1 to 4 serves to shorten a single, continuous straight chain strand, FIGS. 5 to 7 show an arrangement as used in conjunction with two-strand suspensions. The construction of the component 27 largely corresponds to the construction of the component 1 illustrated in FIGS. 1 to 4, identical parts are therefore provided with the same designations. The significant difference as compared with the embodiment previously described is that the basic body 28 of the components 27 is substantially T-shaped, the crossbar of the T, forming a type of yoke, like the basic body 2 of the component 1, has a slight C shape, and the part of the basic body 22 corresponding to the longitudinal bar of the T forms a suspensions head 29 configured as an eyelet for a crane hook, not illustrated.

FIGS. 8 and 9 show a particularly compact component 30 which, like the component 1 according to FIGS. 1 to 4, serves to shorten an individual straight chain strand. In this case, the section of a basic body 31, angled on one side and having the slots 6, 12 and supporting zones 24, 25, has a shortening hook 32, it being possible for a slightly modified pin 33 to be used as a blocking element both for the chain link 34 hooked into the shortening hook 32 and for an element 18 guided in the slot 12.

Figure 10:
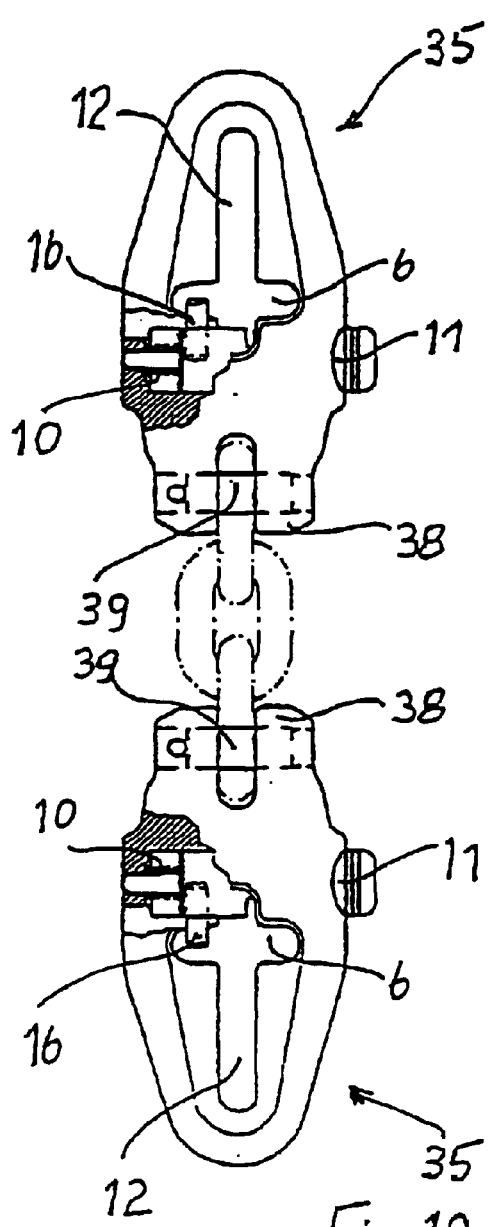
FIG. 10 shows the front view of a shortening arrangement for a chain strand, formed from two identical components.
Figure 11:
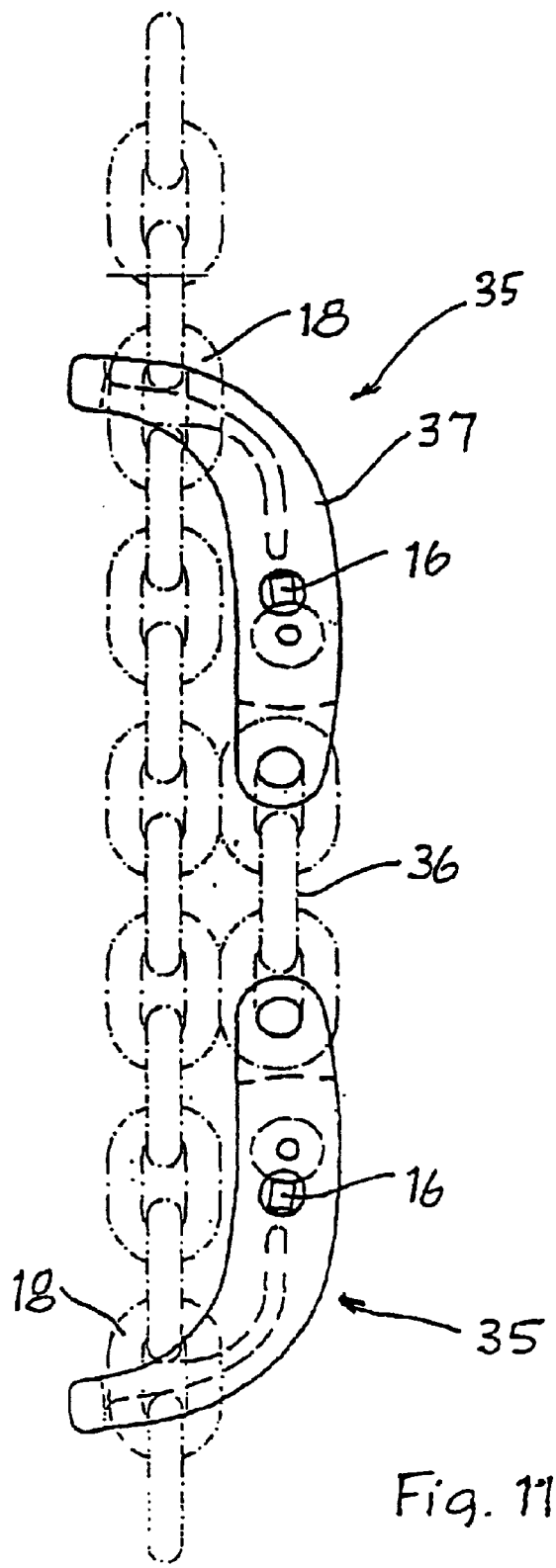
FIG. 11 shows the side view of the arrangement according to FIG. 10 in an unshortened chain strand.

FIGS. 10 and 11, finally, show an arrangement in which two identical components 35 are connected to each other by means of a chain strand section 36 comprising three links. The two components 34 in each case have a basic body 37 with an angled end 3, into which the longer slot 12 of a pair of slots 6, 12 projects. As in the embodiments according to FIGS. 1 to 4, the chain link 18 in each case guided in the longer of the two slots is also secured by a blocking element constructed as a pin 11 against displacement into the crossing area of the slots 6, 12. The mutually facing ends of the basic body 37 of the components 35 are in this case designed as forked heads having connecting forks 38 and holding pins 39.

What is claimed is:

1. A component for regulating or modifying the effective length of round steel chains, in which at least two crossing slots are arranged in a basic body, form an insertion or pull-through opening for the respective chain in their crossing area, one of said slots being longer than the other, the respective longer slot being bounded outside the crossing area of the slots by two supporting zones which serve to support the curved end in each case of a chain link which follows a chain link inserted with its limbs into the longer of the two slots, the chain link which follows the chain link inserted into the longer of said two slots being securable by a blocking element against displacement into the area of the insertion or pull-through opening, characterized in that the blocking element comprises a pin (11; 33) that can be moved to and from and is provided on its circumference with at least one groove (14 or 15), in that the pin (11; 13) is held by a spring (10) in a first position, in which it projects with its cylindrical circumference into the end of the longer slot (12 or 13) in the crossing area of the slots (6, 12 or 7, 13), forming a stop that substantially fills this end and prevents displacement of the chain link (18 or 19) guided in the longer slot (12 or 13) into the crossing area of the slots (6, 12 or 7, 13), and in that the pin (11; 33) can be transferred counter to the action of the spring (10) holding the pin (11; 33) in the first position into a second position, in which its groove (14 or 15) forms the end of the longer slot (12 or 13) in the crossing area of the slots (6, 12 or 7, 13).

2. The component as claimed in claim 1, characterized in that the pin (11; 33) forming the blocking element is provided with at least one protrusion (16 or 17) which, in the blocking position of the pin (11; 33) corresponding to the first position, projects into one of the ends of the shorter slot (6 or 7) oriented parallel to the longitudinal axis of the pin (11; 33).

3. The component as claimed in claim 2, characterized in that the pin (11; 33) has at least one straight groove (14 or 15) which runs at right angles to the longitudinal axis (5) of the longer slot (12 or 13), and is secured against rotation by means of at least one protrusion (16 or 17).

4. The component as claimed in claim 1, characterized in that its basic body (2) has two short slots (6, 7) arranged parallel to each other and a long slot (12, 13) running at right angles to the short slots (6, 7), and in that the long slot (12, 13) is bridged, in the region of its center placed between the short slots (6, 7), by the pin (11) provided on opposite sides with a groove (14 or 15) in each case.

5. The component as claimed in claim 4, characterized in that its basic body (2) is substantially C-shaped.

6. The component as claimed in claim 4, characterized in that its basic body (28) is substantially T-shaped.

7. The component as claimed in claim 6, characterized in that the part of the basic body (28) corresponding to the crossbar of the T is provided with the slots (6, 12 or 7, 13), and its part corresponding to the longitudinal bar of the T is designed as a suspension head (29).

8. The component as claimed in claim 1, characterized in that the section of the longer slot (12) that is bounded by supporting zones (23, 24) is located in an angled end of the basic body (31), and in that the basic body (31) is designed as a shortening hook (32) at its end opposite the angled end.

9. The component as claimed in claim 8, characterized in that the projecting end of the pin (33), serving to introduce a displacement movement into the pin (33) and, in its initial position, protruding beyond the outer side of the basic body (31), forms a block for a chain link (34) hooked into the shortening hook (32).

10. The component as claimed in claim 1, characterized in that the section of the longer slot (12) provided with supporting zones is located in an angled end of the basic body (37), and in that the basic body (37) has a connecting fork (38) for a chain link at its end opposite the angled end.

11. An arrangement having two components as claimed in claim 10, characterized in that the two components (35) are connected to each other via a chain strand section (36).

12. The component as claimed in claim 2, characterized in that its basic body (2) has two short slots (6, 7) arranged parallel to each other and a long slot (12, 13) running at right angles to the short slots (6, 7), and in that the long slot (12, 13) is bridged, in the region of its center placed between the short slots (6, 7), by the pin (11) provided on opposite sides with a groove (14 or 15) in each case.

13. The component as claimed in claim 3, characterized in that its basic body (2) has two short slots (6, 7) arranged parallel to each other and a long slot (12, 13) running at right angles to the short slots (6, 7), and in that the long slot (12, 13) is bridged, in the region of its center placed between the short slots (6, 7), by the pin (11) provided on opposite sides with a groove (14 or 15) in each case.

14. The component as claimed in claim 2, characterized in that the section of the longer slot (12) that is bounded by supporting zones (23, 24) is located in an angled end of the basic body (31), and in that the basic body (31) is designed as a shortening hook (32) at its end opposite the angled end.

15. The component as claimed in claim 3, characterized in that the section of the longer slot (12) that is bounded by supporting zones (23, 24) is located in an angled end of the basic body (31), and in that the basic body (31) is designed as a shortening hook (32) at its end opposite the angled end.

16. The component as claimed in claim 14, characterized in that the projecting end of the pin (33), serving to introduce a displacement movement into the pin (33) and, in its initial position, protruding beyond the outer side of the basic body (31), forms a block for a chain link (34) hooked into the shortening hook (32).

17. The component as claimed in claim 15, characterized in that the projecting end of the pin (33), serving to introduce a displacement movement into the pin (33) and, in its initial position, protruding beyond the outer side of the basic body (31), forms a block for a chain link (34) hooked into the shortening hook (32).

18. The component as claimed in claim 2, characterized in that the section of the longer slot (12) provided with supporting zones is located in an angled end of the basic body (37), and in that the basic body (37) has a connecting fork (38) for a chain link at its end opposite the angled end.

19. The component as claimed in claim 3, characterized in that the section of the longer slot (12) provided with supporting zones is located in an angled end of the basic body (37), and in that the basic body (37) has a connecting fork (38) for a chain link at its end opposite the angled end.

20. An arrangement having two components as claimed in claim 18, characterized in that the two components (35) are connected to each other via a chain strand section (36).

* * * * *